United States Patent [19]

Knowles

[11] 4,354,457
[45] Oct. 19, 1982

[54] METHOD OF AND APPARATUS FOR ENABLING ACCESS TO THE INTERIOR OF FISH-FARMING PONDS AND THE LIKE

[75] Inventor: Albert H. Knowles, Concord, N.H.

[73] Assignee: Robert Harvey Rines, Concord, N.H.; a part interest

[21] Appl. No.: 263,854

[22] Filed: May 14, 1981

[51] Int. Cl.³ .............................................. A01K 61/00
[52] U.S. Cl. ........................................................ 119/3
[58] Field of Search ............... 119/3, 5; 405/218, 219, 405/220, 221

[56] References Cited

U.S. PATENT DOCUMENTS

| | | | |
|---|---|---|---|
| 2,948,121 | 8/1960 | Karst | 405/220 |
| 3,096,623 | 7/1963 | Laird | 405/221 |
| 3,568,451 | 3/1971 | Gustin | 405/221 |
| 4,287,852 | 9/1981 | Rines et al. | 119/3 |

Primary Examiner—Hugh R. Chamblee
Attorney, Agent, or Firm—Rines and Rines, Shapiro and Shapiro

[57] ABSTRACT

This disclosure relates to novel portable walk-way constructions for ready application and withdrawal over floating and other covers extending over considerable areas of fish-farming ponds and the like and having internal openings, the construction enabling manipulation from outside the outer walls of the pond, preferably by pivotal and sliding engagement with the top of the outer wall, or the cover, or both, and preferably with the aid of a strand attached to the lower region of a terminal leg structure depending from the inner edge of the walk-way and adapted to be lowered into and elevated from the cover internal openings.

12 Claims, 3 Drawing Figures

METHOD OF AND APPARATUS FOR ENABLING ACCESS TO THE INTERIOR OF FISH-FARMING PONDS AND THE LIKE

The present invention relates to methods of and apparatus for enabling access to the interior of fish-farming ponds and the like, being more particularly, though not exclusively, concerned with enabling ready access to the interior of ponds carrying surface-floating or similar covers extending over the principal or at least a substantial area of the surface of the pond.

In fish-farming ponds and related systems, it is periodically necessary physically to reach the interior, as for such purposes as cleaning central water exit or drain filters and the like. This is particularly awkward in ponds embodying water-contacting floating or suspended or partly or totally submerged covers, such as light-opaque covers extending over a principal portion of the pond to provide a dark living area or zone therebelow for fish, such as, for example, salmonoids and the like. This environment accelerates the growth of the fish with increased fish densities and remarkable absence of disfigurement, particularly with extended periods of illumination (preferably 24-hour illumination) directed in feed regions external to the cover, as described in copending United States application, Ser. No. 065,617. Such covers may embody internal openings such as central openings within which over-flow pipes and exit drains and filters are provided and which, as before stated, require periodic maintenance and thus the necessity for facile access.

Such access has heretofore been provided by external elevated platforms, or by removing the covers and then replacing them, or by wading into the pond while lifting the covers. The use of platforms is space-consuming, expensive and awkward. The removal of covers and/or wading is messy and also awkward, being particularly difficult for large-size ponds; and, in addition, this is disturbing to the fish, that then require settling-down time after the cover is re-instated before they resume feeding schedule.

An object of the present invention, accordingly, is to provide a new and improved method of and apparatus for obviating these problems and enabling ready and facile portable walk-way application and withdrawal from outside the pond walls and without disturbing the covers or fish thereunder.

A further object is to provide a novel interior-pond access apparatus of broader utility as well.

Other and further objects will be explained hereinafter and are more particularly delineated in the appended claims. In summary, the invention embraces a method of providing access to the interior of a fish-farm pond provided with a water-contacting cover having an internal opening, as for purposes of internal maintenance and the like, that comprises, pushing a longitudinal walk-way provided with terminal transversely depending leg means with a strand attached near its bottom end, inwardly toward the interior of the pond, with the leg means passing over the cover until reaching the lip of the internal cover opening; dropping the leg means over said lip down into the water at said opening to support the walk-way above the cover, thereby enabling access along the walk-way to the internal region of the pond; and thereafter pulling the strand outward of the pond and against the said lip of the cover opening to elevate the leg means through and then clear of the said internal opening lip while pivoting the walk-way downwardly and then slidingly back over the cover. Preferred constructional details and best mode embodiments are later set forth.

The invention will now be described with reference to the accompanying drawing,

FIG. 1 of which is a longitudinal section of a pond with a floating cover to which the walk-way of the invention is to be applied;

Figure 1:
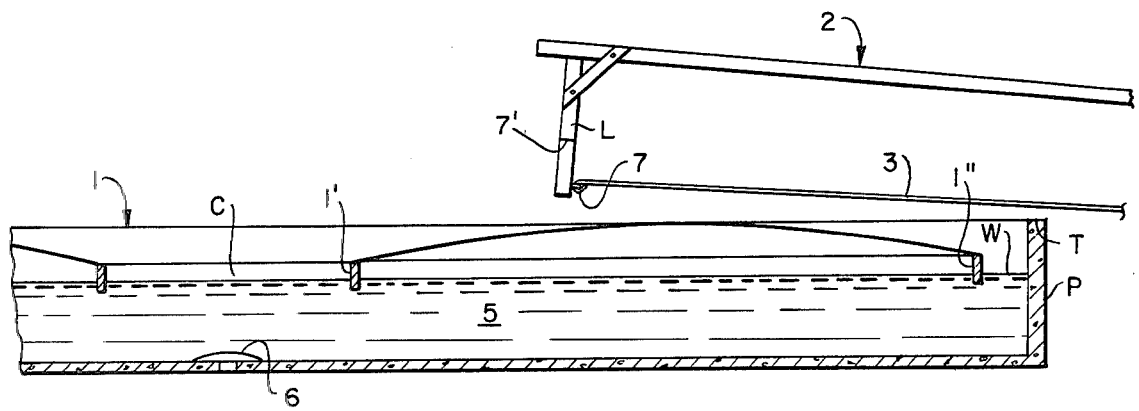

Referring to FIG. 1, a fish-containing or similar pond P (where the term "pond" is intended to be used herein in a generic sense to embrace all types of water volumes), is shown of circular configuration, for example, carrying on its water surface W, a floating cover 1, as of opaque light-blocking material for the dark zone purposes above-described. The cover 1 has an outer lip 1" and an inner lip 1' defining a central internal opening C. A central over-flow pipe and/or filter or other bottom drain 6 of the pond is within the region of the opening C such that the water 5, circulated about the pond, will exit at 6. The cover 1 contacts the water surface W, in this example, floating upon bouyant lips 1' and 1" that rest upon and within the water, and is of concave shape, of increasing and decreasing varying intermediate height, to keep the inner surface clean of feed and other material in the water. Ready and simple access to this interior or central region C of the pond is provided, in accordance with the invention, by a portable walk-way construction, fully operable from the outside of the pond by a single operator, and readily movable from pond to pond.

Figure 2:
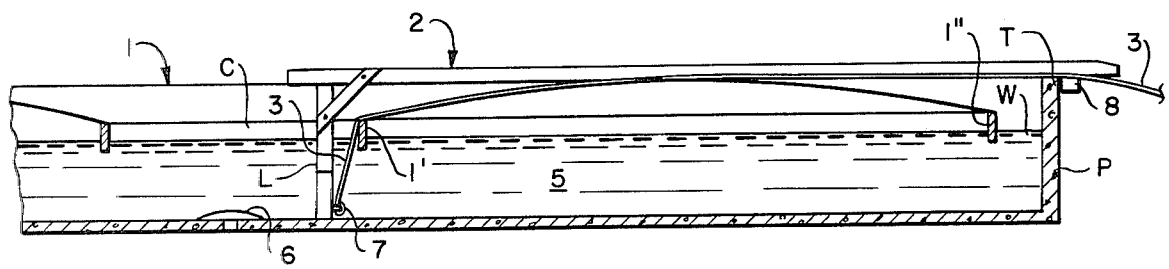
FIG. 2 is a similar view showing the walk-way in place.

The walk-way is in the preferred form of a longitudinally extending surface 2, of length at least substantially equal to the distance from the pond wall to the internal cover opening C, terminating at its inner end in legs L, which may, if desired, be of adjustable length as by telescoping at 7', or otherwise. As an example, the legs are shown pivotal to the open position, and depending below the surface 2 substantially vertically downward. Near the bottom of the leg L, preferably is attached, at 7, a flexible strand 3, as of rope, cable, chain or the like, which can extend outside the outer walls of the pond P when the walk-way 2-L is pushed over the cover 1 towards the interior of the pond at the internal opening C in the cover 1. Continued pushing from outside the right-hand side of the pond P will cause the legs L to drop over the inner lip 1' bounding the cover opening C, dropping through the water 5 and preferably resting on the bottom of the pond, FIG. 2, with the strand 3 accomodating by slacking or draping downwardly over the lip 1', as shown. To limit the further forward movement of the walk-way, a stop 8 may be provided, as on the underside of the surface 2, for engaging the upper outer edge of the pond P, with the surface 2 supported on the right by the top T of the outer pond wall, and on the left, by the legs L of sufficient height to keep the walk-way surface 2 above the highest (center) region of the cover 1, all as illustrated in FIG. 2. Preferably, moreover, the walk-way surface 2 will touch the top surface of the cover 1 to provide stability, particularly for a long walk-way; and, in view of the availability of supporting action of the buoyantly floating (or suspended) cover, additional support can thus be provided the walk-way including, if desired, major support, as where the legs L may not touch the pond bottom.

The operator may then walk to the interior of the pond on the upper surface 2 and perform maintenance or other functions in the interior of the pond, all without in the slightest disturbing the cover 1, the water 5 in the pond or the fish resting under the cover. The support 2 may extend beyond the legs L for additional access, as illustrated.

Figure 3:
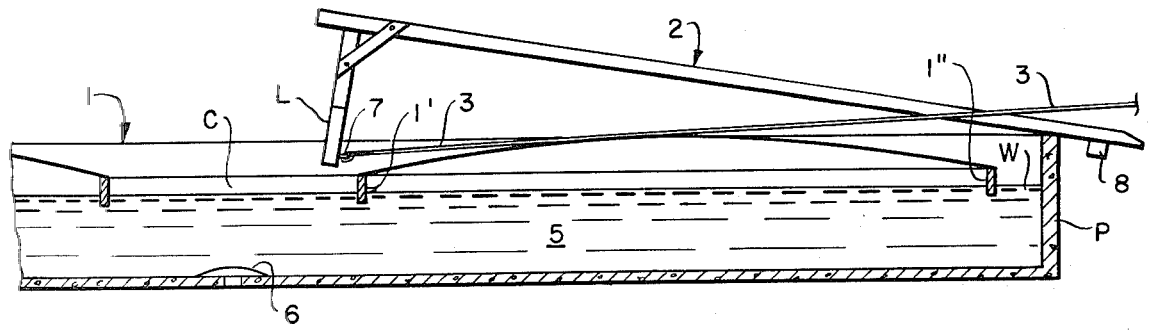
FIG. 3 is again a similar view illustrating withdrawal of the walk-way.

For removal, again by operator control at the outside of the pond P, and again without disturbing the cover or the fish, the strand 3 may be pulled outward, as in FIG. 3, causing the tightening of the slack or drape and drawing the same against and over the lip 1' of the cover opening C, which then provides leverage to elevate the legs L upward out of the opening C. In FIG. 3, this is shown done while pivoting about the top T of the walk-way support 2, with the aid of downward movement of the right-hand end of the support 2 and sliding withdrawal of the same, to the right, over the outer wall at T. If the top of the cover 1 is used for primary support, pivoting and sliding withdrawal there-over can also be effected.

As an example, a 30-foot diameter salmon parr pond P having an opaque fiberglass domed cover C about 10 inches at its highest point, and of 27-foot diameter, the outer lip 1" of which is spaced 1½ feet from the pond wall to provide an illuminated feed zone, may be provided with a 6 to 8 foot opening C. The water height may be about 2 feet, within a 3-foot high pond containing, say, 5500 pounds of the salmon parr, living under the cover. For such a system, the legs L may be about 3 feet and the walk-way support 2, about 15 feet in length.

While described for covered fish ponds, the invention is clearly also applicable to similar systems otherwise employed; and further modifications will occur to those skilled in the art, such as modified leg structures and pivoting and sliding mechanisms, such being considered to fall within the spirit and scope of the invention as defined in the appended claims.

What is claimed is:

1. A method of providing access to the interior of a fish-farm pond provided with a water-contacting cover having an internal opening, as for purposes of internal maintenance and the like, that comprises, pushing a longitudinal walk-way provided with terminal transversely depending leg means with a strand attached near its bottom end, inwardly toward the interior of the pond, with the leg means passing over the cover until reaching the lip of the internal cover opening; dropping the leg means over said lip down into the water at said opening to support the walk-way above the cover, thereby enabling access along the walk-way to the internal region of the pond; and thereafter pulling the strand outward of the pond and against the said lip of the cover opening to elevate the leg means through and then clear of the said internal opening lip while pivoting the walk-way downwardly and then slidingly back over the cover.

2. A method as claimed in claim 1 and in which, when the walk-way is applied, the leg means rests on the pond bottom and, together with the top of the outer wall of the pond, supports the walk-way above the cover; and, following the outward pulling of the strand, the walk-way is pivoted and slidingly withdrawn over the cover.

3. A method as claimed in claim 1 and in which the cover is one of bouyantly floating upon and fixedly suspended upon the pond water surface, providing a relatively fixed surface at said internal opening cover lip against which the strand can be pulled with leverage to elevate the leg end of the walk-way through said opening.

4. Movable walk-way apparatus for use with wall-bounded fish-farm ponds and the like, having covers with internal openings and that are supported upon the water of the pond, said apparatus having, in combination, a longitudinally extending walk-way surface of length at least the distance from the outer wall of the pond to said internal cover openings and provided with terminal depending leg means and adapted to be applied over the pond and cover by pushing the same toward the interior of the pond with the leg means passing over the cover until reaching the lip of the internal cover opening and then dropping therethrough downwardly into the water to support the walk-way surface above the cover; and strand means connected to the lower part of the leg means and of sufficient length to drape over the cover lip at said internal opening when the walk-way surface is so applied, and to reach at least substantially to the said outer wall, so that pulling the strand means outward will straighten out the drape and provide leverage against the said cover lip of the internal opening to elevate the leg means clear of the lip at said internal opening while pivoting downwardly, for slidingly withdrawing the walk-way back over the cover.

5. Movable walk-way apparatus as claimed in claim 4 and in which the cover is one of bouyantly floating, and fixedly suspended upon, the pond water surface to provide strand withdrawal leverage support at the said lip of the cover internal opening.

6. Movable walk-way apparatus as claimed in claim 4 and in which the walk-way surface is provided with stop means for engaging said outer wall to provide a forward limit to the walk-way within said internal cover opening.

7. Movable walk-way apparatus as claimed in claim 4 and in which the leg means is of adjustable height to enable variation of orientation and position over or upon the cover.

8. Movable walk-way apparatus as claimed in claim 4 and in which the outer surface of the cover provides resting support at least in part for the walk-way.

9. Movable walk-way apparatus as claimed in claim 8 and in which pond exit means is provided within the cover internal openings that may require maintenance, and the said walk-way surface extends sufficiently beyond the inner lip of the cover means to enable a person on the walk-way to maintain the exit means.

10. Movable walk-way apparatus as claimed in claim 4 and in which the leg means is of sufficient height to rest on the pool bottom and support the walk-way between the leg means and the top of the outer wall of the pond over the cover; and, during withdrawal, pivoting and sliding withdrawal is effected over said top of the pond outer wall.

11. Movable walk-way apparatus as claimed in claim 10 and in which the cover is of varying height from its outer to inner lips, and the leg means is of sufficient height when taken with the height of the outer pond wall to elevate the walk-way surface at least to the highest region of the cover.

12. Movable walk-way apparatus in combination with a wall-bounded fish-farm pond and the like having a cover with an internal opening and that is supported upon the water of the pond, said apparatus having a longitudinally extending walk-way surface of length at least the distance from the outer wall of the pond to said internal cover opening and provided with terminal depending leg means, said walk-way apparatus being applied over the pond and cover with the leg means being received in the internal cover opening and extending therethrough downwardly into the water to support the walk-way surface above the cover; and means for enabling at least one of the cover and the top of the outer wall of the pond to provide pivoting and sliding support for effecting the elevating of the leg means out of said internal cover opening and withdrawing the walk-way back over the cover.

* * * * *